Patented Nov. 10, 1931

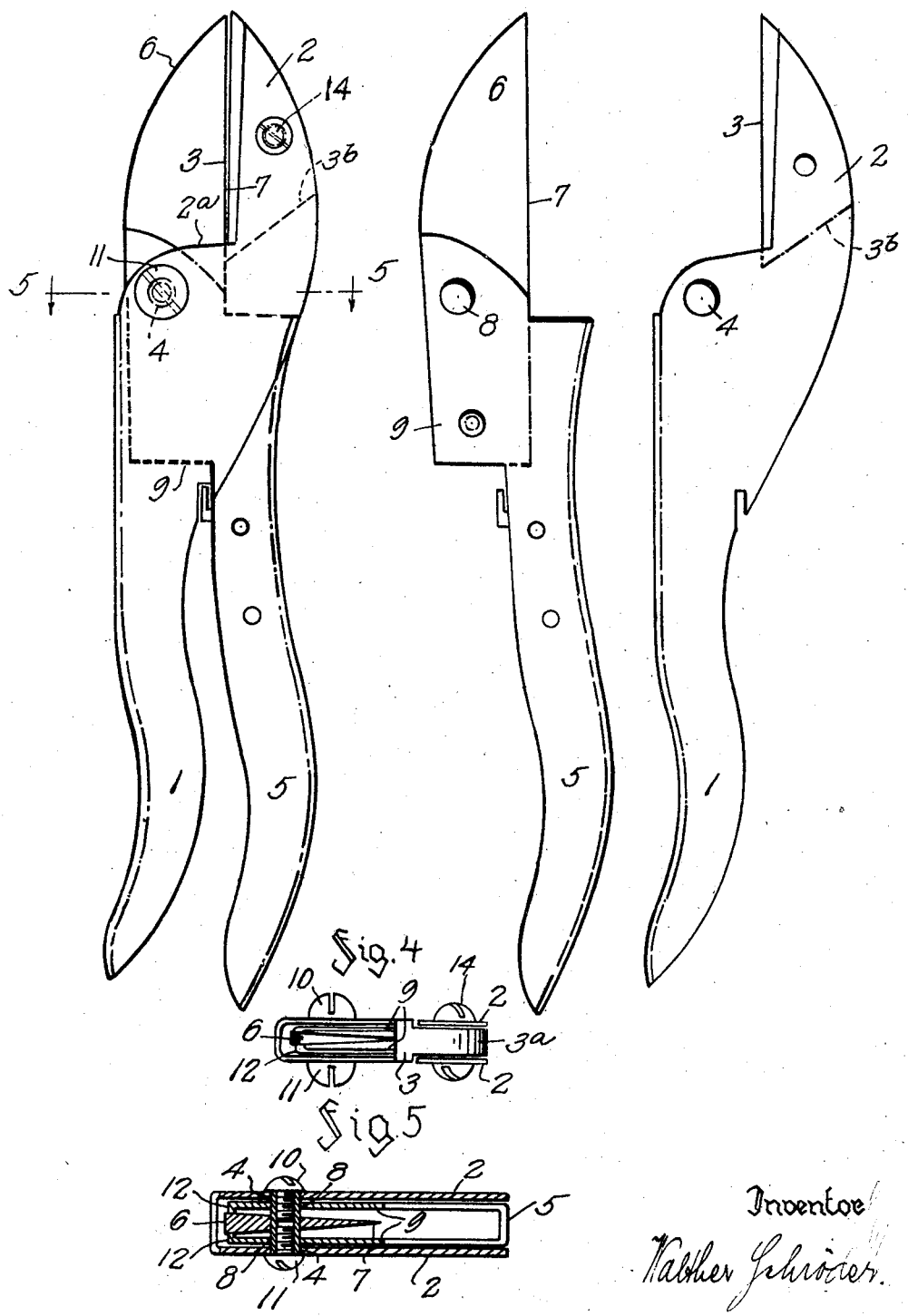

1,831,609

UNITED STATES PATENT OFFICE

WALTHER SCHRÖDER, OF KIEL, GERMANY, ASSIGNOR TO THE FIRM FRITZ HOWALDT, OF KIEL, GERMANY

GARDEN SHEARS

Application filed July 13, 1925, Serial No. 43,234, and in Germany March 3, 1925.

Attempts have been made to construct garden shears in such a way that the blade presses down on to a soft support or abutment but it has not been possible hitherto to produce a practicable shears of this kind.

The garden shears according to the present invention with a single cutter-blade and a broad-surfaced platen, are superior to shears which have two overreaching blades. Furthermore, a single cutter-blade which swings about an axis distant from the platen in such a way as to be moved endwise along said platen for imparting a draw cut, is superior to a single cutter-blade which moves to and from the platen without a draw cut. By means of the improved shears hereinafter described, much thicker branches can be severed than is possible by the use of shears having two coacting blades of the same construction. At the same time a smoother cut without crushing may be had than is possible with the old form of shears. This is accomplished by so arranging the fulcrum of the limbs of the blade and the lever transmission in such a way that a powerful drawing cut is produced.

The present invention contemplates pruning shears of improved construction in which two levers of the first class are pivotally connected on an axis which is parallel to and distant from a relatively broad-surfaced platen carried by the work-arm of one of said levers. The work-arm of the other of said levers is provided with a cutter-blade which is adapted to close down upon the platen throughout the length of its cutting edge and by reason of is pivotal movement to impart a true and powerful drawing cut by means of which twigs and stems of considerable size may be severed without the crushing effects so commonly met with in the use of shears of this character. The levers are provided with suitable handles and preferably pivoted together in a manner permitting ready detachment so that the cutter-blade may be used as a garden knife.

While I am aware that shears are known in which a curved cutter blade cooperates with and enters between laterally-spaced jaws which support the work and while I am furthermore aware that it is common practice to employ shears which are adapted to impart a true shearing draw-cut, I am not aware of any shear having been in use or heretofore contemplated in which a single straight cutter blade which forms a rigid portion of one of said levers of the first class and constitutes the work-arm thereof is movable into and out of full-length engagement with a broad-surfaced platen which is rigid with and constitutes the work-arm of the other of said levers of the first class, the movements of said work-arms being about an axis which is parallel to and distant from said platen so that as the cutter-blade moves towards the platen, it is thereby adapted to impart a true and powerful drawing cut upon the work which is interposed between the closing jaws of the pruning shears.

My invention is hereinafter more fully described with reference to the accompanying drawings in which:—

Figure 1 is an elevation of the shears assembled.

Figure 2 is an elevation of the cutter blade lever detached.

Figure 3 is an elevation of the abutment lever detached.

Figure 4 is an end view of the shears from the cutter end thereof.

Figure 5 is a vertical transverse section on the line 5—5, of Figure 1.

As shown on the drawings, my improved shears comprise two shear levers of peculiar form. Said shear levers are pivoted together intermediately of their ends and each of said levers comprises power and work arms offset with respect to and in substantial parallelism with each other on opposite sides of a common meeting plane between the work arms of both shear levers. One of said shear levers comprises a power arm 1 of channeled cross-section and a work arm comprising vertically-arranged laterally-spaced flanges or plates 2, 2, having their upper edges disposed slightly below the common meeting plane of said work arms to seat the laterally-presented shoulders of a platen block 3 of T-shaped cross-section as shown in Figure 4. The upper surface of platen block 3 forms a flat table for the work-arm of this lever upon which the straight cutting edge of a cutter-blade carried by the work arm of the other lever is adapted to impinge throughout its length. Portions of the laterally-spaced flanges or plates 2, 2, extend upwardly and rearwardly from the rear edge of platen 3, the forwardly-presented edges of said portions forming abrupt laterally-spaced work-holding shoulders 2a which support the work against slipping along the platen during the cutting operation. Holes or pivot bearings 4 are provided in the side plates or flanges at a distance from the upper surface of platen 3, the axis of said holes being further from said platen than it is from the work-holding shoulders or supports 2a. The other lever comprises a power arm 5 of channeled cross-section and a work-arm including a cutter-blade 6 provided with a straight cutting-edge 7 which is adapted to impinge throughout its length upon the upper surface of the platen 3. For this purpose, the work arm of the shear lever which carries the cutter-blade 6 comprises laterally-spaced flanges or plates 9 which as shown best in Figure 5, are provided with holes or pivot-bearings 8 adapted to be brought into coaxial alinement with the bearing holes 4 in the laterally-spaced flanges or plates 2, 2, of the platen lever. The pivot for these levers may be in the form of male and female screws 10 and 11 which enable said levers to be readily assembled and taken apart. As indicated in Figures 4 and 5, the cutter-blade 6 is rigidly mounted in the top plate 12 and between the laterally-spaced bearing plates 9, 9, of the cutter-blade shear lever and is provided with a hole to accommodate the hollow cylindrical shank of the screw 11.

Referring now to Figures 3 and 4, the platen is provided with a relatively narrow insert portion or shank 3a which is presented downwardly between the plates or flanges 2 and conforms to the bottom edges of said plates or flanges. The rear edge 3b of said shank or insert portion, however, is inclined upwardly to the plane of the upper surface of platen 3 as shown in Figures 1 and 2. The platen 3 may be secured in position by means of a screw or rivet 14 which extends through the plates or flanges 2, 2, as well as through the shank or insert portion 3a of the platen.

I claim:

1. Pruning shears comprising two pivotally connected levers of the first class, the work-arm of one of said levers being provided with a flat platen and having laterally-spaced work-holding shoulders extending upwardly from said platen, the work-arm of the other of said levers including a cutter-blade provided with a straight cutting edge movable in the central longitudinal plane of said platen and into and out of line contact therewith, the pivotal axis of said levers being arranged distant from the plane of said platen to produce an endwise movement of the straight cutting edge of said cutter-blade past and between said laterally-spaced work-holding shoulders as it approaches the plane of said platen, said work-holding shoulders being adapted to hold the work from slipping along said platen while the cutting operation is in progress.

2. Pruning shears comprising two levers of the first class, one of said levers having laterally-spaced side plates provided with forward edges forming work-holding shoulders and with a flat platen presented forwardly from and below said work-holding shoulders, the other of said levers comprising a power-arm provided with upwardly-presented laterally-spaced plates pivotally mounted within the laterally-spaced side plates of the first-mentioned lever on an axis distant from the plane of said flat platen and a cutter blade with a straight cutting edge detachably mounted between said upwardly-presented laterally-spaced plates and presented forwardly therefrom and substantially constituting the work-arm of said other lever, said work-holding shoulders being arranged on opposite sides of the plane of movement of said cutter-blade for holding the work from slipping along said platen during the cutting operation.

In testimony whereof I affix my signature.

WALTHER SCHRÖDER.